United States Patent [19]

Isono et al.

[11] Patent Number: 4,643,715

[45] Date of Patent: Feb. 17, 1987

[54] ARTIFICIAL ORGAN AND METHOD FOR MANUFACTURE THEREOF

[75] Inventors: Keinosuke Isono, Kawaguchi; Keiji Naoi, Tokyo, both of Japan

[73] Assignee: Terumo Kabushiki Kaisha, Tokyo, Japan

[21] Appl. No.: 878,059

[22] Filed: Jun. 24, 1986

Related U.S. Application Data

[62] Division of Ser. No. 818,878, Jan. 14, 1986, which is a division of Ser. No. 530,023, Sep. 7, 1983, Pat. No. 4,588,407.

[30] Foreign Application Priority Data

Sep. 9, 1982 [JP] Japan .................. 57-155842
Oct. 6, 1982 [JP] Japan .................. 57-174478
Oct. 6, 1982 [JP] Japan .................. 57-174479
Oct. 6, 1982 [JP] Japan .................. 57-174480

[51] Int. Cl.⁴ .................. A61F 2/02; B01D 13/00
[52] U.S. Cl. .................. 604/4; 604/5; 604/6; 623/11; 623/66; 427/2; 210/645; 210/646; 210/927; 210/321.3; 422/44
[58] Field of Search .............. 623/11, 66; 427/2, 417; 106/243, 287, 35; 424/28; 514/953-955; 604/4-6; 210/645, 646, 927, 321.3, 321.4; 422/44; 549/408; 260/397.2, 396

[56] References Cited

U.S. PATENT DOCUMENTS 4,211,602  7/1980  Brumfield .................. 210/321.3
4,354,933  10/1982  Lester .................. 604/5

Primary Examiner—Richard J. Apley
Assistant Examiner—Gregory Beaucage
Attorney, Agent, or Firm—Frishauf, Holtz, Goodman & Woodward

[57] ABSTRACT

Medical permeating membranes in a zone through which a body fluid flows, said membranes having lateral surfaces in said zone, comprising permeable membranes of regenerated cellulose and a film of a fat-soluble vitamin and glycerin on said lateral surfaces of said membranes in said zone for flow of body fluid.

13 Claims, 9 Drawing Figures

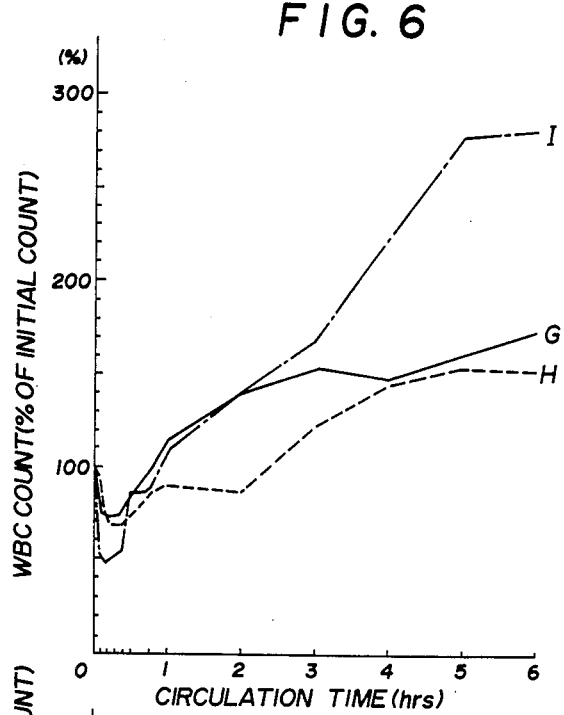
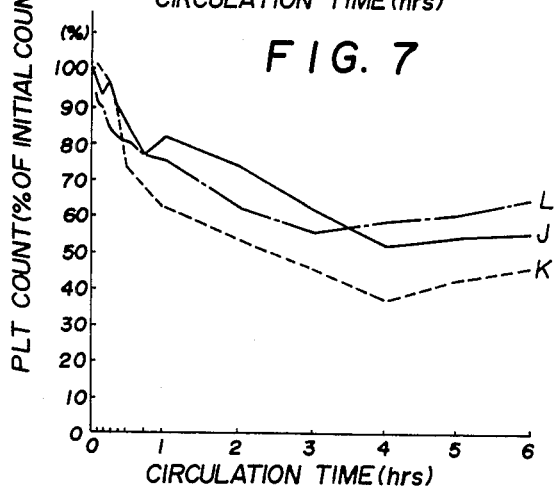

4,643,715

ARTIFICIAL ORGAN AND METHOD FOR MANUFACTURE THEREOF

This is a division of application Ser. No. 818,878 filed Jan. 14, 1986 which is a division of Ser. No. 530,023 filed Sept. 7, 1983 now U.S. Pat. No. 4,588,407.

BACKGROUND OF THE INVENTION

1. Field of the Invention

This invention relates to artificial organs and a method for the manufacture thereof. More particularly, this invention relates to artificial organs such as artificial kidney, artificial lung and plasma separator which effectively function without substantially inducing hemodialysis leukopenia and to a method for the manufacture thereof. This invention further relates to sterilized artificial organs and to a method for the manufacture thereof. It also relates to a medical dialysis membrane which fulfils its function without causing any appreciable secondary effect upon the living system and to a method for the manufacture thereof.

2. Description of Prior Arts

Heretofore artificial organs such as artificial kidney, artificial liver, artificial lung and plasma separator have found acceptance for actual use. Artificial organs, particularly where material exchange is effected as by dialysis, for example, dialysis membranes of hollow-fiber membrane type, flat membrane type, etc. which are made of regenerated cellulose have been used much more than those made of any other material because regenerated cellulose far excels other materials in terms of dialytic property, mechanical strength, cost, etc. The artificial organ which uses membranes of regenerated cellulose such as, for example, the artificial kidney made of regenerated cellulose can inflict upon the patient's body secondary effects such as the so-called hemodialysis leukopenia, a phenomenon that the patient's count of leukocytes shows an abrupt decrease temporary immediately after the dialysis is started. At times, these secondary effects manifested on the patient may be too serious to be ignored.

Recently, membranes of synthetic polymers such as polymethyl methacrylate, polyacrylonitrile, ethylenevinyl alcohol copolymer and polycarbonate have been proposed as membranes permeable to body fluids. In these membranes, the hemodialysis leukopenia is manifested relatively weaker than in the aforementioned membranes of regenerated cellulose. In the membranes of synthetic polymers, however, the physical properties exhibited during assemblage or during service thereof, i.e. their physical strength, thermal resistance and ultrafiltration ratio (UFR), are not well balanced with their behavior in permeation. Thus, these membranes are usable only on a limited number of patients. Moreover, they are expensive and pinholes tend to form during service. Besides, they have specific requirements for the method by which they will be effectively sterilized. As a solution to these problems, there has been proposed the concept of modifying the surface of regenerated cellulose membranes by the use of heparin, for example. This approach, however, has not yet yielded satisfactory results.

SUMMARY OF THE INVENTION

An object of this invention, therefore, is to provide an improved artificial organ and a method for the manufacture thereof.

Another object of this invention is to provide an artificial organ which effectively functions without inflicting appreciable secondary effect upon the living system and a method for the manufacture of the artificial organ.

Still another object of this invention is to provide an artificial organ which effectively functions without substantially inducing hemodialysis leukopenia and a method for the manufacture of the artificial organ. Yet another object of this invention is to provide a sterilized artificial organ which effectively functions without inflicting appreciable secondary effects upon the living system and a method for the manufacture of the artificial organ.

A further object of this invention is to provide a medical permeable membrane which effectively functions without inflicting appreciable secondary effects upon the living system and a method for the manufacture of the sterilized artificial organ.

These objects are accomplished by this invention providing an artificial organ having a film of a fat-solution vitamin deposited on the surface of the parts thereof susceptible to contact with the body fluid under treatment in the zone permitting flow of the aforementioned body fluid inside the artificial organ.

The aforementioned objects are accomplished by this invention providing a method for the manufacture of an artificial organ having a film of a fat-soluble vitamin deposited on the surface of the parts thereof susceptible to contact with the body fluid under treatment in the zone permitting flow of the aforementioned body fluid inside the artificial organ, which method is characterized by the steps of allowing a solution of a fat-soluble vitamin in an organic solvent to flow through the body fluid-flowing zone inside the artificial organ and allowing the parts susceptible to contact with this solution to be thoroughly wetted with the solution, then discharging the remnant part of the solution out of the artificial organ, and subsequently drying the solution deposited on the surface of the aforementioned parts thereby expelling the aforementioned organic solvent from the deposited solution.

These objects are accomplished by this invention providing a sterilirzed artificial organ wherein the lateral surface of the body fluid-flowing zone thereof is coated with a fat-soluble vitamin, then exposed to contact with a physiologically harmless liquid, and subjected to a treatment for sterilization. These objects are also accomplished by this invention providing a method for the manufacture of a sterilized artificial organ, which method comprises the steps of coating the surface of the body fluid-permeating membrane in the body fluid-flowing zone inside the artificial organ with a solution of a fat-soluble vitamin in an organic solvent, then expelling the aforementioned organic solvent from the solution deposited on the aforementioned surface, bringing a physiologically harmless liquid into contact with the aforementioned surface of the body fluid-flowing zone, and subjecting this surface to a treatment for sterilization.

These objects are accomplished by this invention providing a sterilized artificial organ wherein the lateral surface of the body fluid-flowing zone thereof is coated with a fat-soluble vitamin and glycerin, then exposed to contact with a physiologically harmless liquid, and subjected to a treatment for sterilization. These objects are also accomplished by this invention providing a method for the manufacture of a sterilized artificial organ, which method comprises the steps of coating the surface of the body fluid-permeating membrane in the body fluid-flowing zone inside the artificial organ with a solution of a fat-soluble vitamin and glycerin in an organic solvent, then expelling the aforementioned organic solvent from the solution deposited on the aforementioned surface, bringing a physiologically harmless liquid into the aforementioned lateral surface of the body fluid-flowing zone, and subjecting this surface to a treatment for sterilization.

These objects are accomplished by this invention providing a medical permeating membrane having a film of a fat-soluble vitamin and glycerin deposited on the body fluid-flowing lateral surface of a permeable regenerated cellulose membrane.

These objects are accomplished by this invention providing a method for the manufacture of a medical permeating membrane having a film of a fat-soluble vitamin and glycerin deposited on the body fluid-flowing lateral surface of a permeable regenerated cellulose membrane, which method is characterized by allowing a solution of a fat-soluble vitamin and glycerin in an organic solvent to flow through the aforementioned body fluid-flowing lateral surface of the permeable regenerated cellulose membrane thereby causing the part of the aforementioned membrane exposed to contact with the aforementioned solution to be thoroughly wetted with the solution, then discharging the remnant of the solution out of the membrane, and subsequently drying the solution deposited on the aforementioned surface of the membrane thereby expelling the aforementioned organic solvent from the solution.

This invention is directed to an artificial organ wherein at least part of the body fluid-flowing zone thereof comprises a body fluid-permeating membrane. This invention is also directed to an artificial organ wherein the regenerated cellulose membrane is a hollow-fiber type membrane. This invention is further directed to an artificial organ wherein the fat-soluble vitamin is at least one member selected from the group consisting of vitamin A, vitamin D, vitamin E, vitamin K and ubiquinone and is preferably vitamin E. The artificial organ contemplated by this invention is an artificial kidney, an artificial liver, an artificial lung or a plasma separator, for example.

This invention is directed to a method for the manufacture of an artificial organ wherein the organic solvent is at least one member selected from the group consisting of a chlorofluorohydrocarbon, a fluorohydrocarbon and a lower alcohol. This invention is directed to a method for the manufacture of an artificial organ wherein the concentration of the fat-soluble vitamin in the solution thereof in the organic solvent is in the range of from 0.01 to 10 w/v%. This invention is further directed to a method for the manufacture of an artificial organ wherein the drying of the deposited solution is effected by passing through the aforementioned body fluid-flowing zone a gas inert to the aforementioned fat-soluble vitamin at a temperature in the range of from 10° to 80° C. This invention is also directed to a method for the manufacture of a sterilized artificial organ wherein the aforementioned physiologically harmless liquid comprises water, physiological saline solution, or an aqueous glycerin solution.

This invention is directed to a medical permeating membrane and to a method for the manufacture of the medical permeating membrane wherein the proportions of fat-soluble vitamin and glycerin fall in the range of from 1:100 to 1:1 by weight ratio.

BRIEF DESCRIPTION OF THE DRAWINGS

FIG. 6 is a graph showing the time-course change of the count of leukocytes in another embodiment;

FIG. 7 is a graph showing the time-course change of the count of blood platelets in another embodiment;

PREFERRED EMBODIMENT OF THE INVENTION

By the expression "artificial organ" as used in the present invention is meant an artificial organ such as an artificial kidney, an artificial liver, an artificial lung, a plasma separator, a blood circuit or an artificial blood vessel which incorporates therein a zone for the passage of body fluid such as blood. The body fluid-flowing zone of the artificial organ is desired to have at least part thereof comprise a body fluid-permeating membrane. This expression "artificial organ" embraces a tube, a connector, etc. which connect the artificial organ to the living system of the patient under medication and a blood circuit, and others as well.

Figure 1:
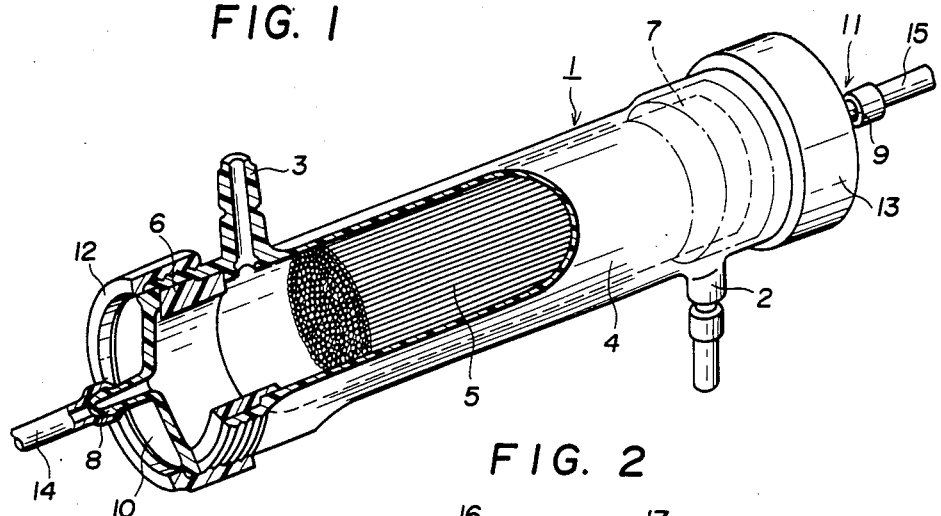
FIG. 1 is a partially cutaway perspective view illustrating one embodiment of the artificial organ according to the present invention.

Now, one embodiment of this invention will be described below with reference to the accompanying drawings. FIG. 1 illustrates a typical artificial kidney, namely a hollow-fiber type dialyzer. A dialyzer 1 comprises a tubular main barrel 4 provided near the opposite ends thereof with an inlet pipe 2 and an outlet pipe 3 for the flow of a dialyzing liquid, a hollow fiber bundle 5 consisting of a multiplicity of hollow fibers and inserted in the cavity of the tubular main barrel 4, and potting rings 6, 7 made of polyurethane, for example, and disposed at the opposite ends of the hollow fiber bundle 5 to seal these opposite ends in conjunction with the opposite ends of the tubular main barrel 5, so that the dialyzer 1 will assume a construction similar to the shell-and-tube type construction found, for example, in a heat exchange device. Headers 10, 11 provided respectively with an inflow orifice 8 and an outflow orifice 9 are abutted against the opposite ends of the aforementioned tubular main barrel 4. Caps 12, 13 are helically set in position to immobilize the headers 10, 11 respectively to the tubular main barrel 4. To the aforementioned inflow orifice 8 and the outflow orifice 9 are connected tubes 14, 15 which are extended and connected to the human body.

The hollow fibers which make up the hollow fiber bundle 5 constitute dialysis membranes and are made of regenerated cellulose, polymethyl methacrylate, polyacrylonitrile, ethylenevinyl alcohol copolymer or polycarbonate. Regenerated cellulose proves desirable among other membrane materials above. Among various types of regenerated cellulose, the regenerated cellulose product of the cuprammonium process proves particularly desirable.

In accordance with the present invention, the parts of the artificial kidney of the aforementioned construction which are adapted to contact with a body fluid like blood while the blood is in motion through the blood-flowing zone of the artificial kidney, specifically the inner surfaces of the hollow fibers, the inner surface of the cavity defined by the header 10 and the potting ring 6, the inner surface of the cavity defined by the heater 11 and the potting ring 7, the inner, surface of the blood inflow orifice 8, the inner surface of the blood outflow orifice 9, and the inner surfaces of the tubes 14, 15 are coated with a film of a fat-soluble vitamin, with particular emphasis on the inner surfaces of the hollow fibers. In the case of the hollow-fiber membranes, for example, this invention contemplates coating the inner surface of each of the hollow fiber membranes 16 with a film 17 of a fat-soluble vitamin.

Figure 2:
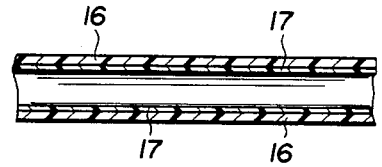
FIG. 2 is a longitudinal cross section of a hollow fiber.
Figure 3:
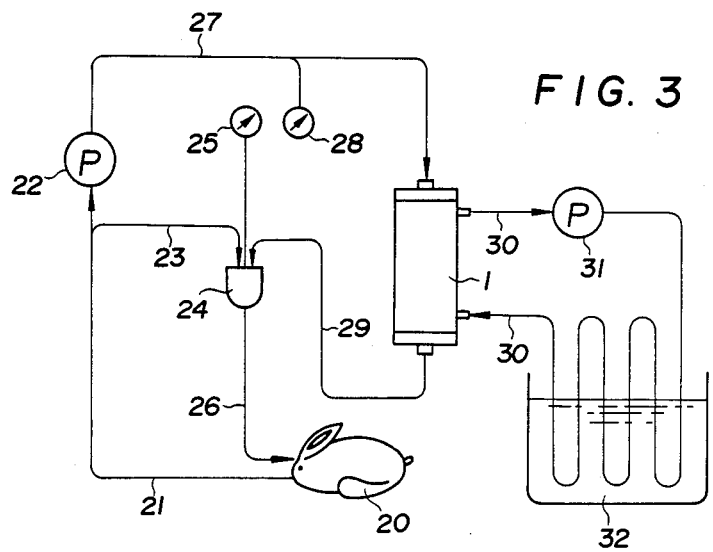
FIG. 3 is a diagram illustrating an experimental circuit for the evaluation of performance of the artificial organ according to the present invention.

In this case, permeable membranes having a physiologically harmless aqueous solution fill the gaps intervening between the lateral surfaces of the adjacent body fluid-permeating membranes are obtained by causing the inner surfaces of the hollow fiber membranes to be amply wetted with a solution of the fat-soluble vitamin in an organic solvent, then discharging the remnant solution out of the hollow fiber membranes, drying the solution deposited on the hollow fiber menbranes thereby expelling the organic solvent from the solution, introducing the aforementioned physiologically harmless aqueous solution into the artificial organ incorporating the hollow fiber membranes, and subsequently sterilizing the artificial organ by heating it in an autoclave or irradiating it with gamma rays, for example. Preparatory to its actual use, this aqueous solution is removed from the artificial organ and, when necessary, may be rinsed with water. In consequence of the treatment described above, a film 17 of a fat-soluble vitamin or a film 17 of the mixture of a fat-soluble vitamin with glycerin is formed on the inner surface each of the hollow fiber membranes 16 as illustrated in FIG. 2.

Examples of the fat-soluble vitamin usable advantageously for the purpose of this invention include vitamin A, vitamin D, vitamin E, vitamin K and ubiquionone, with vitamin E preferred over the others. The thickness of the coat of the fat-soluble vitamin is in the range of from 0.0001 to 0.1 $\mu$m, preferably from 0.002 to 0.05 $\mu$m.

Examples of vitamin A include vitamins A such as retinol, vitamin $A_1$ alcohol, retinal, vitamin $A_1$ aldehyde, vitamin $A_1$ acid, 3-dehydroretinal, vitamin $A_2$ alcohol, 3-dehydroretinal and vitamin $A_2$ aldehyde; provitamins A such as $\beta$-carotene, $\alpha,\alpha$-carotene, $\alpha$-carotene, $\beta,\epsilon$-carotene, $\gamma$-carotene and $\beta,\phi$-carotene; and cisvitamins A.

Examples of vitamin D include vitamins D such as vitamin $D_2$, vitamin $D_3$, vitamin $D_4$, vitamin $D_5$, vitamin $D_6$ and vitamin $D_7$; and corresponding provitamins D.

Examples of vitamin E include tocopherols such as $\alpha$-tocopherol, $\beta$-tocopherol, $\gamma$-tocopherol and $\delta$-tocopherol; and tocotrienols, such as $\alpha$-tocotrienol, $\beta$-tocotrienol, $\gamma$-tocotrienol and $\delta$-tocotrienol.

Examples of vitamin K include vitanins $K_1$ and vitamins $K_2$. Examples of ubiquinone include ubiquinone-1 through ubiquinone-12 (Q-1 through Q-12), and oxides and axino-related compounds thereof.

The fat-soluble vitamin is dissolved at a concentration in the range of from 0.01 to 10 w/v %, preferably from 0.05 to 2.0 w/v %, in an organic solvent. The solution thus prepared is caused to flow into the body fluid-flowing zone of the artificial organ (the blood-flowing zone in the case of the artificial kidney illustrated in FIG. 1 and FIG. 2) and allowed to remain in contact with the zone for a stated period such as, for example, 30 seconds to 60 minutes, preferably 1 to 10 minutes so as to have the inner surfaces of the parts in the aforementioned zone such as, for example, the inner surfaces of the tube 14, the cavity defined by the header 10 and the potting ring 6, the hollow fiber, the cavity defined by the header 11 and the potting ring 7, and the tube 15 amply wetted with the aforementioned fat-soluble vitamin. A film of the aforementioned fat-soluble vitamin is deposited on the aforementioned surfaces by subsequently discharging the solution from the artificial organ and introducing into the artificial organ a gas inert to the fat-soluble vitamin such as, for example, air, nitrogen or carbon dioxide gas at a temperature in the range of from 10° to 80° C., preferably from 15° to 30° C. thereby expelling the organic solvent by distillation from the solution. When necessary, the artificial organ may be rinsed with water. In this case, the film of the fat-soluble vitamin may be formed particularly in the portion packed with the permeating membranes. Especially in the artificial organ incorporating regenerated cellulose membranes which are liable to induce hemodialysis leukopenia, a notable effect in curbing this detestable phenomenon can be obtained by having the film of fat-soluble vitamin deposited preponderantly on the portion packed with the permeating membranes. Where such permeating membranes are made of regenerated cellulose, particularly regenerated cellulose of the cuprammonium process, the aforementioned solution of fat-soluble vitamin in the organic solvent may additionally incorporate glycerin therein. The addition of glycerin serves the purpose of enhancing the hydrophilicity of the permeating membrane. It is, therefore, effective in artificial organs such as artificial kidney and artificial liver which are required to use hydrophilic permeating membranes. The concentration of glycerin in the aforementioned solution is in the range of from 0.1 to 10 w/v %, preferably from 1 to 5 w/v %.

Examples of organic solvent usable advantageously for the purpose of this invention are chlorofluorohydrocarbon such as 1,1,2-trichloro-1,2,2-trifluoroethane, trichlorofluoromethane and 1,1,2,2-tetrachloro-1,2-difluoroethane; fluorohydrocarbons such as tetrafluoroethylene; alcohols such as methanol, ethanol, n-propanol, isopropanol, n-butanol, isobutanol, sec-butanol and 2-ethylhexanol; and diethyl ether. The chlorofluorohydrocarbons, fluorohydrocarbons and lower alcohols prove particularly desirable among other organic solvents enumerated above. Chlorofluorohydrocarbons, especially 1,1,2-trichloro-1,2,2-trifluoroethane are the best choice.

When glycerin is used in combination with the fat-soluble vitamin in the aforementioned coating solution, the proportions of the fat-soluble vitamin and the glycerin are in the range of from 1:100 to 1:1, preferably from 1:50 to 1:2.7, by weight ratio.

The artificial organ produced as described above is sterilized by the use of an autoclave, ethylene oxide or gamma rays, for example and then put to storage. Optionally, an ordinary artificial organ which has been sterilized and put to storage may be given the aforementioned treatment for deposition of a film of fat-soluble vitamin immediately before the organ is put to use.

The invention has been described mainly with respect to the artificial kidney, namely, a dialyzer. Of course, this invention is equally usable in an artificial liver, an artificial blood vessel, a blood circuit, a plasma separator, etc. This invention proves particularly effective when the aforementioned film of the fat-soluble vitamin is formed in the portion packed with permeating membranes for the body fluid, particularly blood.

Now, this invention will be described more specifically below with reference to working examples.

EXAMPLE 1

A bundle of 368 hollow fibers of regenerated cellulose product of the cuprammonium process each measuring 200 μm in inside diameter, 220 μm in outside diameter, and 14 to 14.5 cm in length was inserted in a tubular main barrel 4, with the opposite ends of the bundle fixed in position with potting rings 6, 7 both of polyurethane as illustrated in FIG. 1. Headers 10, 11 were attached to the opposite ends of the tubular main barrel 4 and caps 12, 13 were helically set to immobilize the headers 10, 11 to the tubular main barrel 4 and complete a dialyzer (artificial kidney) 1. The total inner surface of the membranes in this dialyzer was found to be 300 $cm^2$.

Separately, an ethanol solution of vitamin E (DL-α-tocopherol) and glycerin was prepared by dissolving 1.0 g of vitamin E and 2.0 g of glycerin in 100 ml of ethanol. A 50-ml syringe was connected to one end of the aforementioned dialyzer 1, with the other end of the dialyzer 1 immersed in the aforementioned solution of vitamin E. By operating the plunger of this syringe, the dialyzer 1 was filled with the vitamin E solution. The dialyzer 1 was then allowed to stand in situ at room temperature for about 5 minutes. Then, the dialyzer 1 was lifted out of the solution and caused to discharge an excess of the vitamin E solution. It was subsequently connected to an aspirator and was dried in a stream of air at a temperature of 25° C. To ensure thorough drying, the dialyzer was left standing overnight in an oven kept at 60° C. The dialyzer thus completed was autoclaved at 115° C. for 30 minutes for the purpose of sterilization. Inside the dialyzer thus obtained, the film of vitamin E formed therein was estimated to have a theoretical thickness of about 0.05 μm.

EXAMPLE 2

A dialyzer was produced by following the procedure of Example 1, except that the concentration of vitamin E in the ethanol solution of vitamin E and glycerin was changed to 0.1 w/v %. Inside this dialyzer, the film of vitamin E formed therein was estimated to have a theoretical thickness of about 0.005 μm.

CONTROL 1

A dialyzer was produced by following the procedure of Example 1, except that the treatment with the ethanol solution of vitamin E and glycerin was omitted for the purpose of comparison.

EXAMPLE 3

Vitamin E (DL-α-tocopherol) was dissolved at a concentration of 1 w/v % in ethanol. In the solution thus obtained, a polystyrene plate was immersed for 3 minutes. The wetted plate was lifted out of the solution and left standing at room temperature until it was thoroughly dried to afford a test piece. Another test piece was similarly obtained by using a solution of 0.1 w/v % of vitamin E in ethanol. These test pieces and a control (untreated) test piece were subjected to the blood platelet expansion test and the results of the test were rated.

The blood platelet expansion test was conducted by the following procedure. In a syringe made of polypropylene and containing 0.5 ml of 3.8% sodium citrate, 4.5 ml of intravenous blood was taken from a healthy human being. The blood now containing sodium citrate was transferred into a test tube made of polypropylene and centrifuged at 800 r.p.m. for five minutes. The resultant PRP was combined with a diluent (a 9:1 mixture of physiological saline solution and 3.8% sodium citrate) to prepare a suspension of blood platelets. This suspension was dropped on a given test piece (a plate 0.4 mm in thickness). The test piece wetted with the suspension was left standing for a stated length of time to permit deposition and expansion of blood platelets. The blood platelets were fixed with 2% glutaraldehyde, gradually dehydrated with ethanol solutions of serially changed concentrations, then dried, and observed under an electron microscope. The results of the blood platelet expansion test were rated by the count of blood platelets deposited in a unit area of 0.11 $mm^2$ and the morphological alteration of blood platelets. The morphological alteration was classified into the following three types:

Type I: Blood platelets so changed that they are in the shape of discs and spheres each shooting forth three to four pseudopodia and are believed to stick rather weakly to the surface of the substrate.

Type II: Blood platelets so changed that they each extend at least several pseudopodia, with cells expanded to half the lengths of such pseudopodia and are believed to stick strongly to the surface of the substrate.

Type III: Blood platelets so changed that they each extend thin normal bodies to half the lengths of such pseudopodia and have such normal bodies expanded substantially and thinned so as to assume affinity and are believed to stick completely to the surface of the substrate.

The test results thus obtained are shown in Table 1.

TABLE 1

| Test piece | VE 1.0% | VE 0.1% | Control |
|---|---|---|---|
| Type I (%) | 79.5 | 75.5 | 35.3 |
| Type II (%) | 12.1 | 14.2 | 26.0 |
| Type III (%) | 8.4 | 10.3 | 38.7 |
| Field of vision | 42.6 | 40.3 | 15.7 |

EXAMPLE 4

Each of the rabbits was weighed and then fixed on the back on a Kitajima type fixed bed. The hair in the regions selected for incision was cut with an electric clipper and the skin exposed by the removal of hair was wiped clean with a wad of absorbent cotton wetted with alcohol. With a pair of scissors, the front of the rabbit was incised along the medial line from below the jaw to the collar bone. The muscular limbs were cut open and the right (left) common carotid artery was peeled off carefully so as to avoid impairing nerves, ramified blood vessels and neighboring tissues. Then the left (right) anterior facial vein was peeled off carefully and a Surfro indwelling catheter (trademark of Tenumo Corp.) filled with physiological saline solution containing 1 IU of heparin per ml and stoppered with an injection rubber cap was inserted and bound tightly in position. Similarly a catheter was inserted into the aforementioned artery and bound tightly in position.

The rabbits used in the test had weights as shown in Table 2.

TABLE 2

| Test piece | Weight (kg) |
|---|---|
| VE 1.0% | 2.53 |
| VE 0.1% | 2.66 |
| Control | 2.58 |

On a rabbit 20 prepared as described above, a varying dialyzer 1 obtained in Examples 1–2 and Control 1 was incorporated to establish an experiment circuit. A catheter 21 connected to the artery of the rabbit 20 was connected to a pump 22. A bypass catheter 23 was connected to the aforementioned catheter 21. This bypass catheter 23 was connected to a chamber 24 which communicated with an outlet 25 side of a manometer. The chamber 24 and the artery of the rabgit 20 were joined with a catheter 26. The pump 22 and the dialyzer 1 were joined with a tube 27, which communicated with an inlet 28 side of the manometer. Further, the dialyzer 1 and the chamber 24 were joined with a tube 29. In the meantime, the outlet and the inlet of the dialyzer 1 for passage of the dialyzing liquid were joined with a tube 30. This tube 30 incorporated therein a pump 31 and was immersed in a water bath 32 kept at 37° C. The circuit thus formed was subjected to priming purge with the physiological saline solution containing 1 IU of heparin per ml (100 ml).

The blood taken from the rabbit was diluted to twice the original volume with phsiological saline solution containing 1.5% EDTA-3K and calculated with an ELT-8 (Ortho Instrument). The counts of leukocytes (WBC), the counts of blood platelets (PLT), and the hematocrit numbers (HCT) consequently determined were as shown in Tables 3–5. The counts of leukocytes and the counts of blood platelets were compensated for the relevant hematocrit numbers in accordance with the following formula and were reported as the values corresponding to the HCT values existing immediately before start of circulation of the blood through the circuit.

$$C_x = C_o \frac{HCT_x}{HCT_o}$$

wherein $C_x$ stands for value of compensation, $C_o$ for found value, $HCT_x$ for compensated standard Hct value = initial Hct value, and $HCT_o$ for Hct value existing when the value of $C_o$ was obtained.

TABLE 3

| | (Vitamin E 1.0%) | | | | | |
|---|---|---|---|---|---|---|
| | WBC | | PLT | | HCT | |
| Time | /mm³ | PIC (%) | ×10⁴/mm³ | PIC (%) | % | PIC (%) |
| Start | 6200 | 100.0 | 61.3 | 100.0 | 43.3 | 100.0 |
| 5 min. | 5710 | 92.1 | 57.3 | 93.5 | 39.4 | 91.0 |
| 10 | 5530 | 89.2 | 56.3 | 91.8 | 39.9 | 92.1 |
| 15 | 5520 | 89.0 | 54.8 | 89.4 | 39.2 | 90.5 |
| 20 | 5200 | 83.9 | 53.4 | 97.1 | 39.1 | 90.3 |
| 30 | 5240 | 84.5 | 50.6 | 82.5 | 39.7 | 91.7 |
| 45 | 5150 | 83.1 | 46.7 | 76.1 | 39.5 | 91.2 |

TABLE 3-continued

| | (Vitamin E 1.0%) | | | | | |
|---|---|---|---|---|---|---|
| | WBC | | PLT | | HCT | |
| Time | /mm³ | PIC (%) | ×10⁴/mm³ | PIC (%) | % | PIC (%) |
| 1 hr. | 6030 | 97.3 | 46.1 | 75.2 | 38.8 | 89.6 |
| 2 | 7380 | 119.0 | 42.4 | 69.2 | 39.3 | 90.7 |
| 3 | 6650 | 107.3 | 34.9 | 56.9 | 41.0 | 94.7 |
| 4 | 6710 | 108.2 | 37.1 | 60.5 | 41.3 | 95.4 |
| 5 | 7640 | 123.2 | 37.9 | 61.8 | 40.8 | 94.2 |
| 6 | 7490 | 120.8 | 36.8 | 60.0 | 39.9 | 92.1 |

PIC means percent of initial count.

TABLE 4

| | (Vitamin E. 0.1%) | | | | | |
|---|---|---|---|---|---|---|
| | WBC | | PLT | | HCT | |
| Time | /mm³ | PIC (%) | ×10⁴/mm³ | PIC (%) | % | PIC (%) |
| Start | 5700 | 100.0 | 61.6 | 100.0 | 45.4 | 100.0 |
| 5 min. | 5340 | 93.7 | 53.2 | 86.4 | 40.8 | 89.9 |
| 10 | 5410 | 94.9 | 54.4 | 88.3 | 40.3 | 88.8 |
| 15 | 5030 | 88.2 | 53.9 | 87.5 | 40.6 | 89.4 |
| 20 | 4780 | 78.6 | 47.1 | 76.5 | 40.6 | 89.4 |
| 30 | 4630 | 81.2 | 42.4 | 68.8 | 42.2 | 93.0 |
| 45 | 5080 | 89.1 | 38.8 | 63.0 | 40.2 | 88.5 |
| 1 hr. | 5040 | 88.4 | 37.9 | 61.5 | 40.5 | 89.2 |
| 2 | 6320 | 110.9 | 32.2 | 52.3 | 39.5 | 87.0 |
| 3 | 7640 | 134.0 | 33.8 | 54.9 | 39.8 | 87.7 |
| 4 | 9750 | 171.1 | 34.3 | 55.7 | 39.1 | 86.1 |
| 5 | 10590 | 185.5 | 32.8 | 52.4 | 40.3 | 88.8 |
| 6 | 11870 | 208.2 | 29.9 | 48.5 | 39.0 | 85.9 |

TABLE 5

| | (Vitamin E none) | | | | | |
|---|---|---|---|---|---|---|
| | WBC | | PLT | | HCT | |
| Time | /mm³ | PIC (%) | ×10⁴/mm³ | PIC (%) | % | PIC (%) |
| Start | 8100 | 100.0 | 86.4 | 100.0 | 44.4 | 100.0 |
| 5 min. | 4230 | 52.2 | 79.8 | 92.4 | 39.9 | 89.9 |
| 10 | 3850 | 47.5 | 76.8 | 88.9 | 39.2 | 88.3 |
| 15 | 4100 | 50.6 | 73.2 | 84.7 | 41.2 | 92.8 |
| 20 | 4520 | 55.8 | 71.4 | 82.6 | 40.3 | 90.8 |
| 30 | 6820 | 84.2 | 69.8 | 80.8 | 38.4 | 86.5 |
| 45 | 6870 | 84.8 | 66.7 | 77.2 | 39.4 | 88.7 |
| 1 hr. | 8790 | 108.5 | 64.8 | 75.0 | 38.9 | 87.6 |
| 2 | 11520 | 142.2 | 54.7 | 63.3 | 39.7 | 89.4 |
| 3 | 13720 | 169.4 | 47.8 | 55.3 | 38.2 | 86.5 |
| 4 | 18130 | 223.8 | 50.3 | 58.2 | 38.7 | 87.2 |
| 5 | 22500 | 277.8 | 52.3 | 60.5 | 37.1 | 83.6 |
| 6 | 22690 | 280.1 | 55.7 | 64.5 | 36.6 | 82.4 |

Figure 4:
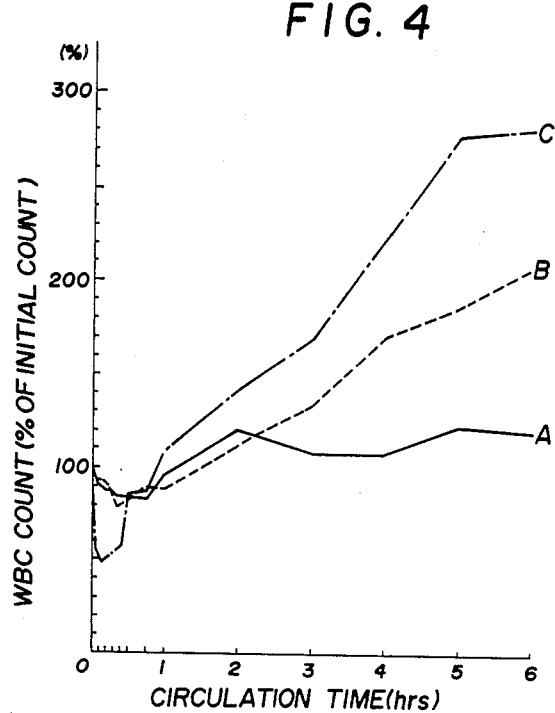
FIG. 4 is a graph showing the time-course change of the count of leukocytes.
Figure 5:
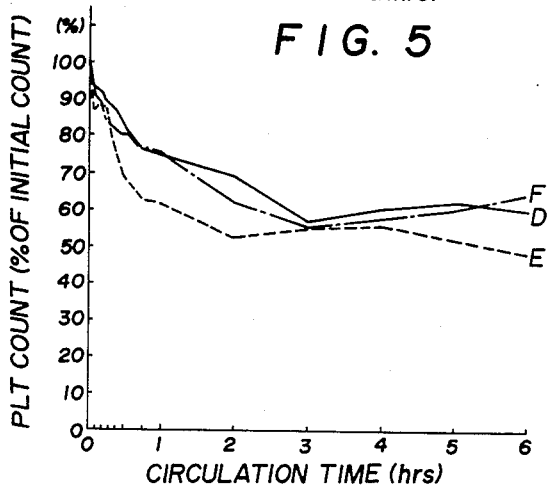
FIG. 5 is a graph showing the time-course change of the count of blood platelets.

The time-course change of the counts of leukocytes obtained from the results mentioned above is graphically indicated in FIG. 4. In this graph, the curve A represents the data obtained by the dialyzer using 1.0% of vitamin E, the curve B those obtained by the dialyzer using 0.1% of vitamin E, and the curve C those obtained by the dialyzer using no vitamin E respectively. The time-course change of the counts of blood platelets is graphically indicated in FIG. 5. In this graph, the curve D represents the data obtained by the dialyzer using 1.0% of vitamin E, the curve E those obtained by the dialyzer using 0.1% of vitamin E, and the curve F those obtained by the dialyzer using no vitamin E respectively.

EXAMPLE 5

A dialyzer was produced by following the procedure of Example 1, except that the dialyzer which had been left standing overnight in an over at 60° C. was filled with distilled water, placed in situ within an autoclave, and heated therein at a temperature of 115° C. for 30 minutes for the purpose of sterilization.

EXAMPLE 6

A dialyzer was produced by following the procedure of Example 1, except that the concentration of vitamin E in the ethanol solution of vitamin E and glycerin was changed to 0.1 w/v %.

CONTROL 2

For the purpose of control, a dialyzer was produced by following the procedure of Example 5, except that the treatment with the ethanol solution of vitamin E and glycerin was omitted and the wetting of the dialyzer was effected simply by autoclaving.

EXAMPLE 7

The dialyzers prepared in Examples 5-6 and Control 2 were subjected to the same test as involved in Example 4. The results were as shown in Tables 6-8.

TABLE 6

| (Vitamin E 1.0%) | | | | | |
|---|---|---|---|---|---|
| | WBC | | PLT | | HCT |
| Time | /mm$^3$ | PIC (%) | ×10$^4$/mm$^3$ | PIC (%) | % | PIC (%) |
| Start | 6700 | 100.0 | 71.0 | 100.0 | 48.0 | 100.0 |
| 5 min. | 5830 | 87.0 | 68.0 | 95.8 | 42.8 | 89.2 |
| 10 | 5050 | 75.4 | 66.0 | 93.6 | 41.8 | 87.1 |
| 15 | 4940 | 73.7 | 68.5 | 96.5 | 44.7 | 93.1 |
| 20 | 4950 | 73.9 | 63.5 | 89.4 | 44.6 | 92.9 |
| 30 | 5930 | 88.5 | 59.5 | 83.8 | 41.3 | 86.0 |
| 45 | 6590 | 98.4 | 55.1 | 77.6 | 43.7 | 91.0 |
| 1 hr. | 7650 | 114.2 | 58.2 | 82.0 | 43.9 | 91.5 |
| 2 | 9380 | 140.0 | 51.8 | 73.0 | 43.0 | 89.6 |
| 3 | 10400 | 155.2 | 43.8 | 61.7 | 43.4 | 90.4 |
| 4 | 9950 | 148.5 | 36.8 | 51.8 | 44.4 | 92.5 |
| 5 | 10740 | 160.3 | 38.5 | 54.2 | 43.8 | 91.3 |
| 6 | 11690 | 174.5 | 39.3 | 55.4 | 42.7 | 89.0 |

PIC means percent of initial count.

TABLE 7

| (Vitamin E 0.1%) | | | | | |
|---|---|---|---|---|---|
| | WBC | | PLT | | HCT |
| Time | /mm$^3$ | PIC (%) | ×10$^4$/mm$^3$ | PIC (%) | % | PIC (%) |
| Start | 8900 | 100.0 | 85.7 | 100.0 | 51.7 | 100.0 |
| 5 min. | 8210 | 92.2 | 93.0 | 108.5 | 42.8 | 82.7 |
| 10 | 6700 | 75.2 | 85.3 | 99.5 | 46.3 | 89.6 |
| 15 | 6110 | 68.7 | 79.7 | 93.0 | 47.4 | 91.7 |
| 20 | 6080 | 68.3 | 74.8 | 87.3 | 46.8 | 90.5 |
| 30 | 6780 | 76.2 | 63.3 | 73.9 | 47.3 | 91.5 |
| 45 | 7660 | 85.4 | 57.8 | 67.4 | 48.3 | 93.4 |
| 1 hr. | 8180 | 91.9 | 53.9 | 62.9 | 47.4 | 91.6 |
| 2 | 7850 | 88.2 | 46.5 | 54.3 | 48.1 | 93.0 |
| 3 | 10890 | 122.4 | 38.9 | 45.4 | 45.3 | 87.2 |
| 4 | 13120 | 147.4 | 32.5 | 37.9 | 45.3 | 87.6 |
| 5 | 13720 | 154.2 | 36.6 | 42.7 | 45.6 | 88.2 |
| 6 | 13700 | 153.9 | 39.2 | 45.7 | 43.4 | 83.9 |

TABLE 8

| (Vitamin E none) | | | | | |
|---|---|---|---|---|---|
| | WBC | | PLT | | HCT |
| Time | /mm$^3$ | PIC (%) | ×10$^4$/mm$^3$ | PIC (%) | % | PIC (%) |
| Start | 8100 | 100.0 | 86.4 | 100.0 | 44.4 | 100.0 |
| 5 min. | 4230 | 52.2 | 79.8 | 92.4 | 39.9 | 89.9 |
| 10 | 3850 | 47.5 | 76.8 | 88.9 | 39.2 | 88.3 |
| 15 | 4100 | 50.6 | 73.2 | 84.7 | 41.2 | 92.8 |
| 20 | 4520 | 55.8 | 71.4 | 82.6 | 40.3 | 90.8 |
| 30 | 6820 | 84.2 | 69.8 | 80.8 | 38.4 | 86.5 |
| 45 | 6870 | 84.8 | 66.7 | 77.2 | 39.4 | 88.7 |

TABLE 8-continued

| (Vitamin E none) | | | | | |
|---|---|---|---|---|---|
| | WBC | | PLT | | HCT |
| Time | /mm$^3$ | PIC (%) | ×10$^4$/mm$^3$ | PIC (%) | % | PIC (%) |
| 1 hr. | 8790 | 108.5 | 64.8 | 75.0 | 38.9 | 87.6 |
| 2 | 11520 | 142.2 | 54.7 | 63.3 | 39.7 | 89.4 |
| 3 | 13720 | 169.4 | 47.8 | 55.3 | 38.2 | 86.5 |
| 4 | 18130 | 223.8 | 50.3 | 58.2 | 38.7 | 87.2 |
| 5 | 22500 | 277.8 | 52.3 | 60.5 | 37.1 | 83.6 |
| 6 | 22690 | 280.1 | 55.7 | 64.5 | 36.6 | 82.4 |

The time-course change of the counts of leukocytes obtained from the results mentioned above is graphically indicated in FIG. 6. In this graph, the curve G represents the data obtained by the dialyzer using 1.0% of vitamin E, the curve H those obtained by the dialyzer using 0.1% of vitamin E, and the curve I those obtained by the dialyzer using no vitamin E respectively. The time-course change of the counts of blood platelets obtained from the results mentioned above is graphically indicated in FIG. 7. In this graph, the curve J represents the data obtained by the dialyzer using 1.0% of vitamin E, the curve K those obtained by the dialyzer using 0.1% of vitamin E, and the curve L those obtained by the dialyzer using no vitamin E respectively.

EXAMPLE 8

A dialyser was produced by following the procedure of Example 1, except that 0.5 w/v % solution of vitamin E in 1,1,2-trichloro-1,2,2-trifluoroethane was used instead of ethanol solution of vitamin E and glycerin. Inside this dialyser, the film of vitamin E formed therein was estimated to have a theoretical thickness of about 0.025 μm.

The dialyser thus produced was tested by a similar manner to Example 4 to obtain the results shown in Tables 9 and 10.

Figure 8:
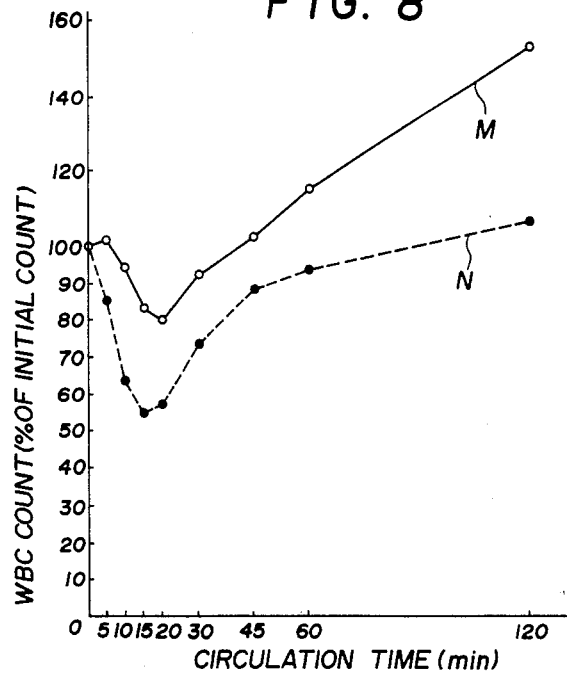
FIG. 8 is a graph showing the time-course change of count of leukocytes in still another embodiment.
Figure 9:
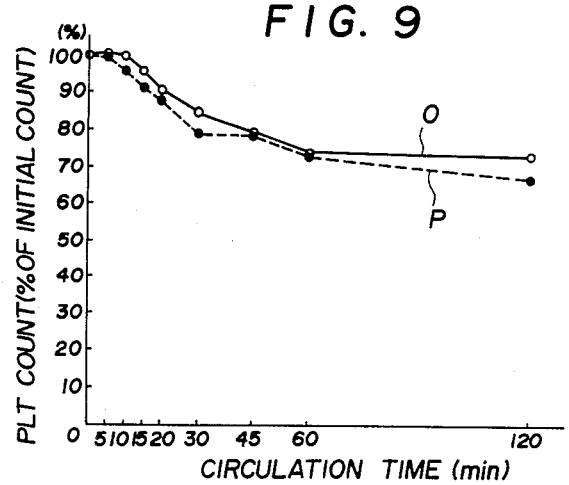
FIG. 9 is a graph showing the time-course change of the count of blood platelets in still another embodiment.

The time-course change of the counts of leukocytes obtained from the results mentioned above is graphically indicated in FIG. 8. In this graph, the curve M represents the data obtained by the dialyzer using 0.5% of vitamin E, and the curve N those obtained by the dialyzer using no vitamin E respectively. The time-course change of the counts of blood platelets obtained from the results mentioned above is graphically indicated in FIG. 9. In this graph, the curve 0 represents the data obtained by the dialyzer using 0.5% of vitamin E, and the curve P those obtained by the dialyzer using no vitamin E respectively.

TABLE 9

| (Vitamin E 0.5%) | | | | | |
|---|---|---|---|---|---|
| | WBC | | PLT | | HCT |
| Time | /mm$^3$ | PIC (%) | ×10$^4$/mm$^3$ | PIC (%) | % | PIC (%) |
| 0 | 7870 | 100.0 | 84.4 | 100.0 | 46.7 | 100.0 |
| 5 | 8030 | 102.0 | 84.8 | 100.5 | 41.0 | 87.8 |
| 10 | 7290 | 92.6 | 85.0 | 100.7 | 44.7 | 95.7 |
| 15 | 6550 | 83.2 | 81.2 | 96.2 | 42.4 | 90.8 |
| 20 | 6300 | 80.1 | 77.0 | 91.2 | 42.3 | 90.6 |
| 30 | 7290 | 92.6 | 72.0 | 85.3 | 42.7 | 91.4 |
| 45 | 8000 | 101.1 | 67.1 | 79.5 | 41.1 | 88.0 |
| 60 | 8930 | 113.5 | 62.8 | 74.4 | 41.4 | 88.7 |
| 120 | 11800 | 149.9 | 62.1 | 73.6 | 39.5 | 84.6 |

TABLE 10

| | WBC | | PLT | | HCT | |
|---|---|---|---|---|---|---|
| Time (min) | /mm$^3$ | PIC (%) | ×10$^4$/mm$^3$ | PIC (%) | % | PIC (%) |
| 0 | 8880 | 100.0 | 66.7 | 100.0 | 47.0 | 100.0 |
| 5 | 7160 | 80.6 | 65.1 | 97.6 | 39.5 | 84.0 |
| 10 | 5900 | 66.4 | 63.5 | 95.2 | 40.6 | 86.4 |
| 15 | 4480 | 50.5 | 60.7 | 91.0 | 40.8 | 86.8 |
| 20 | 5030 | 56.6 | 58.5 | 87.7 | 40.5 | 86.2 |
| 30 | 6530 | 73.5 | 52.9 | 79.3 | 40.4 | 86.0 |
| 45. | 7790 | 87.7 | 53.1 | 79.6 | 40.4 | 86.0 |
| 60 | 8340 | 93.9 | 49.7 | 74.5 | 40.0 | 85.1 |
| 120 | 9610 | 108.2 | 45.4 | 68.1 | 38.6 | 82.1 |

(Vitamin E none)

As described above, the artificial organ of the present invention has a film of either a fat-soluble vitamin or mixture of such a fat-soluble vitamin with glycerin deposited on the surfaces of the parts of the artificial organ susceptible to body fluid in the zone for flow of the body fluid within the artificial organ. The fat-soluble vitamin, therefore, functions to alleviate the secondary effect such as, for example, hemodialysis leukopenia (loss of leukocytes which occurs when leukocytes recognize a dialysis membrane as a foreign substance). This alleviation of the secondary effect is effected because the albumin in the blood, when the blood comes into contact with the fat-soluble vitamin, adheres to the layer of fat-soluble vitamin and acquires an anticoagulating property. Particularly when the artificial organ happens to be an artificial organ for exogenous circulation incorporating dialysis membranes in at least part thereof and the dialysis membranes are made of regenerated cellulose, the hemodialysis leukopenia which has occurred heavily in the conventional artificial organ can be alleviated strikingly. Thus, the great possibility of infection experienced by the conventional artifical organ owing to the drop of the count of leukocytes in the initial stage of treatment with the artificial organ can be lessened. Although vitamin A, vitamin D, vitamin E, vitamin K and ubiquinone are all usable effectively as fat-soluble vitamins, vitamin E exhibits the best effect in curbing the aforementioned hemodialysis leukopenia or expansion of blood platelets. Thus, the artificial organ contemplated by the present invention is useful as an artificial kidney, an artificial liver, an artificial lung, a plasma separator, a blood circuit or an artificial blood vessel. This invention manifests its effect particularly in an artificial kidney. When the fat-soluble vitamin is used in combination with glycerin as described above, the added glycerin goes to enhance the properties of the permeable membranes of regenerated cellulose such as, for example, mechanical strength, hydrophilicity and dialyzing property.

The artificial organ of this invention is manufactured by causing a solution of a fat-soluble vitamin or a mixture of such a fat-soluble vitamin with glycerin in an organic solvent to flow into the zone for flow of body fluid inside the artificial organ thereby allowing the parts of the artificial organ adapted to contact the solution to be amply wetted with the solution, then discharging an excess of the solution out of the artificial organ, and subsequently drying the solution deposited on the aforenentioned parts thereby expelling the organic solvent from the solution. Thus, the deposition of the film of the fat-soluble vitamin can be carried out easily at a low cost. Further since this deposition does not require any chemical reaction, the work of this deposition entails a remote possiblity of defiling the artificial organ. Moreover, the fat-soluble vitamin to be used for the coating functions to alleviate possible a secondary effect such as hemodialysis leukopenia and the glycerin which is additionally used functions to retain the desirable properties of the permeable membrane of regenerated cellulose in good condition.

The lateral surface of the zone for flow of body fluid is coated with a physiologically harmless liquid and then subjected to a treatment for sterilization. Simply by removing this liquid, the surfaces of the aforementioned permeable membranes in the zone for flow of body fluid are ready for deposition thereon of the film of the fat-soluble vitamin. Since the aforementioned vitamin is soluble in fat, it does not spontaneously dissolve out during the storage of the artificial organ.

What is claimed is:

1. Medical permeating membranes at least portions of which are adopted to be in a zone through which a body fluid flows, said membranes having lateral surfaces adopted to be in said zone, comprising permeable membranes of regenerated cellulose and a film of a fat-soluble vitamin and glycerin on said lateral surfaces of said membranes.

2. The medical permeating membranes according to claim 1, wherein said film contains said fat-soluble vitamin in an amount of not less than 0.1 mg per m$^2$ of said permeable membranes of regenerated cellulose and glycerin in an amount of at least 0.5% based on the weight of said permeable membranes of regenerated cellulose.

3. The medical permeating membranes according to claim 2, wherein said fat-soluble vitamin is at least one member selected from the group consisting of vitamin A, vitamin D, vitamin E, vitamin K and uviquinone.

4. The medical permeating membranes according to claim 1, wherein said permeable membranes of regenerated cellulose are hollow fiber type membranes.

5. The medical permeating membranes according to claim 2, wherein said fat-soluble vitamin is at least one member selected from the group consisting of vitamin A, vitamin D, vitamin E, vitamin K and uviquinone.

6. The medical permeating membranes according to claim 5, wherein said permeable membranes of regenerated cellulose are hollow fiber type membranes.

7. The medical permeating membranes according to claim 2, wherein said permeable membranes of regenerated cellulose are hollow fiber type membranes.

8. The medical permeating membranes according to claim 3, wherein said permeable membranes of regenerated cellulose are hollow fiber type membranes.

9. The medical permeating membranes according to claim 6, wherein said fat-soluble vitamin is vitamin A.

10. The medical permeating membranes according to claim 6, wherein said fat-soluble vitamin is vitamin D.

11. The medical permeating membranes according to claim 6, wherein said fat-soluble vitamin is vitamin E.

12. The medical permeating membranes according to claim 6, wherein said fat-soluble vitamin is vitamin K.

13. The medical permeating membranes according to claim 6, wherein said fat-soluble vitamin is uviquinone.

* * * * *